(12) United States Patent
McCann et al.

(10) Patent No.: US 7,702,915 B2
(45) Date of Patent: Apr. 20, 2010

(54) ACCESS AUTHENTICATION SYSTEM

(75) Inventors: Stephen McCann, Southampton (GB); Robert Hancock, Southampton (GB); John May, Southampton (GB); Michael Hook, Southampton (GB)

(73) Assignee: Roke Manor Research Limited, Romsey (GB)

( * ) Notice: Subject to any disclaimer, the term of this patent is extended or adjusted under 35 U.S.C. 154(b) by 1563 days.

(21) Appl. No.: 09/960,396

(22) Filed: Sep. 24, 2001

(65) Prior Publication Data

US 2002/0037708 A1 Mar. 28, 2002

(30) Foreign Application Priority Data

Sep. 22, 2000 (GB) .................................. 0023270.2

(51) Int. Cl.
G06F 21/20 (2006.01)
(52) U.S. Cl. .................... 713/184; 380/270; 455/432
(58) Field of Classification Search ............... 713/184, 713/183; 455/432; 380/270; 726/8
See application file for complete search history.

(56) References Cited

U.S. PATENT DOCUMENTS

| 5,668,876 | A | * | 9/1997 | Falk et al. ................... 380/271 |
| 5,878,276 | A | * | 3/1999 | Aebli et al. .................. 710/19 |
| 5,907,815 | A | * | 5/1999 | Grimm et al. ................ 455/557 |
| 6,061,650 | A | * | 5/2000 | Malkin et al. ............... 704/228 |
| 6,112,078 | A | * | 8/2000 | Sormunen et al. ........... 455/411 |
| 6,259,925 | B1 | * | 7/2001 | Josse ......................... 455/466 |
| 6,430,407 | B1 | * | 8/2002 | Turtiainen .................. 455/411 |
| 6,477,644 | B1 | * | 11/2002 | Turunen ...................... 713/161 |
| 6,512,754 | B2 | * | 1/2003 | Feder et al. .................. 370/338 |
| 6,563,800 | B1 | * | 5/2003 | Salo et al. ................... 370/264 |
| 6,597,924 | B1 | * | 7/2003 | Smith ......................... 455/557 |

(Continued)

FOREIGN PATENT DOCUMENTS

EP 0944203 9/1999

(Continued)

OTHER PUBLICATIONS

Parasuraman et al., "A Model for Types and Levels of Human Interaction with Automation", 2000, IEEE, pp. 1-12.*

(Continued)

*Primary Examiner*—Matthew B Smithers
*Assistant Examiner*—Jeffery Williams
(74) *Attorney, Agent, or Firm*—Crowell & Moring LLP

(57) ABSTRACT

To gain visiting access to a wireless local area network (W-LAN), the operator of which administers a visitor authentication, authorization and accounting (VAAA) server, a user requesting such access must have a valid cellular mobile account, a portable computing device with a browser and a valid W-LAN card from another operation that administers a home authentication, authorization and accounting (HAAA) server. The user, inputs, via the VAAA server, identity information that enables the HAAA to issue a personal identification number (PIN) which is encoded and forwarded to the user's mobile telephone. This encoded PIN is transferred to the browser to authenticate the requested visiting access, and the costs of such access are billed to the user's cellular mobile account. The requested access is achieved via the user's browser. The user may employ the browser to convey the identity information, to the VAAA via the W-LAN, or via the mobile telephone.

22 Claims, 2 Drawing Sheets

U.S. PATENT DOCUMENTS

Figure 1:
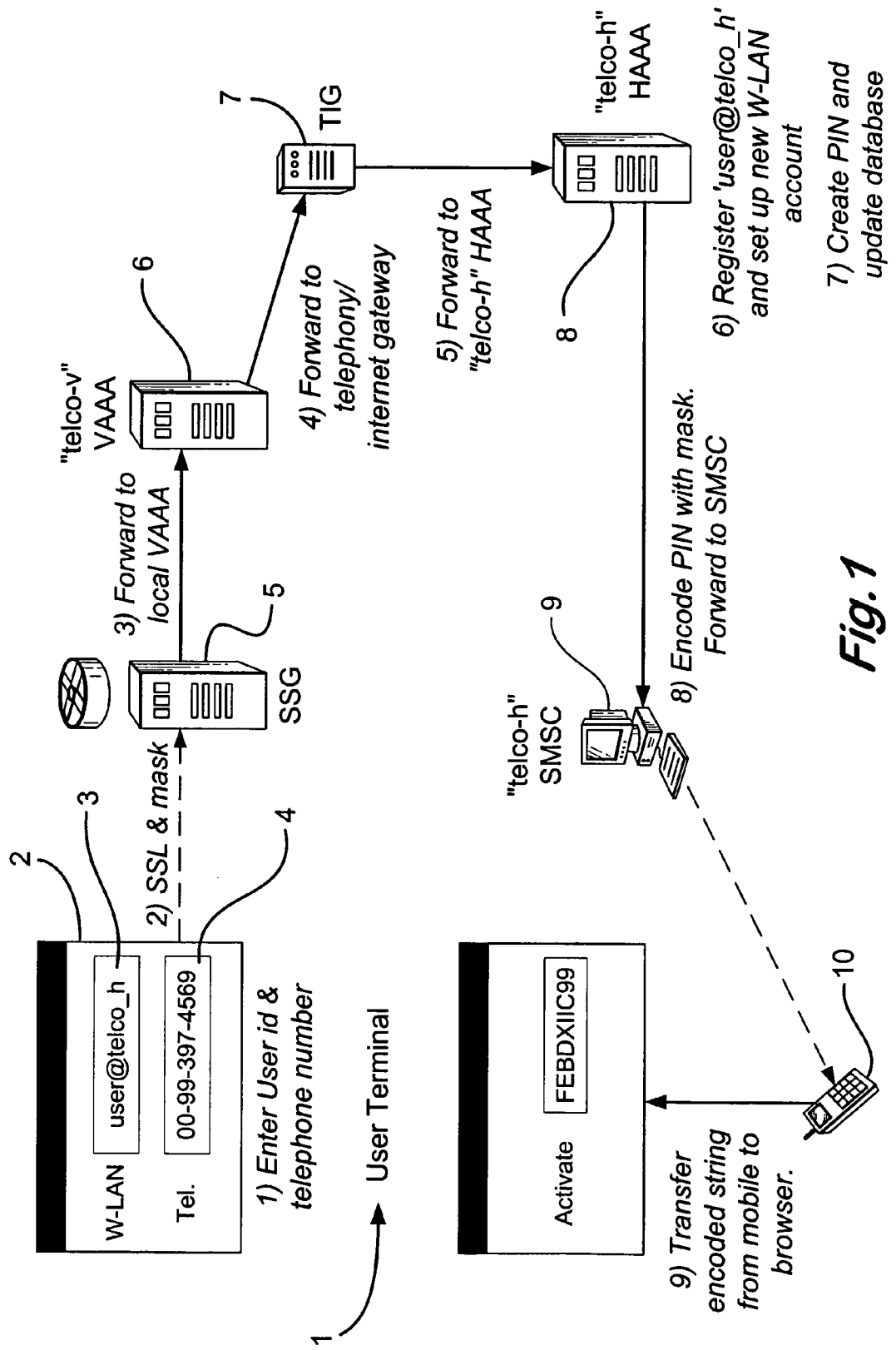

| | | | |
|---|---|---|---|
| 6,675,208 B1 * | 1/2004 | Rai et al. | 709/224 |
| 6,738,621 B1 * | 5/2004 | Kazem et al. | 455/427 |
| 6,782,080 B2 * | 8/2004 | Leivo et al. | 379/93.04 |
| 6,785,823 B1 * | 8/2004 | Abrol et al. | 726/7 |
| 7,046,642 B1 * | 5/2006 | Cheng et al. | 370/320 |
| 2002/0064142 A1 * | 5/2002 | Antonio et al. | 370/335 |
| 2002/0068554 A1 * | 6/2002 | Dusse | 455/419 |
| 2002/0114288 A1 * | 8/2002 | Soliman | 370/310 |
| 2003/0103607 A1 * | 6/2003 | Feakes | 379/88.17 |

FOREIGN PATENT DOCUMENTS

| | | | |
|---|---|---|---|
| GB | 2342816 | | 4/2000 |
| GB | 2350970 | | 12/2000 |
| GB | 2350975 | | 12/2000 |
| NL | C1007409 | * | 2/1998 |
| WO | 00/67446 | | 11/2000 |
| WO | WO0115462 A1 | * | 3/2001 |

OTHER PUBLICATIONS

Agrawal, P.; Sreenan, C.J., "Get wireless: a mobile technology spectrum," IT Professional, vol. 1, No. 4, pp. 18-23, Jul./Aug. 1999.*

Schneier, Bruce, Applied Cryptography, Second Edition, 1996, John Wiley and Sons, pp. 170-175.*

Hiller et al., "CDMA2000 Wireless Data Requirements for AAA", 2000, NWG, pp. 1-14.*

M. Mouly, et al., "GSM System for mobile communications" Europe Media, 1993, pp. 432-498.

M. Mouly, et al., "GSM System for mobile communications" Europe Media, 1993, pp. 500-565.

Search Report.

* cited by examiner

ACCESS AUTHENTICATION SYSTEM

This invention relates to access authentication systems for Wireless Local Area Networks (W-LANs), and it relates especially to such systems as can cope with the problems of user-mobility between W-LANs.

In W-LAN systems, it is often the case that a user, subscribing with one network operator (hereinafter called "the Home Operator" for that user), wishes to connect, as a "visitor", to one or more other W-LAN sites. The operator of the visited W-LAN site, however, needs to be convinced of the bona fides and credit worthiness of the visitor before permitting access to the W-LAN system and/or before supplying the visitor with certain services or information. Our previous patent application No. (GB0022604.3; Internal No. 2000P04883GB) envisages the visiting user basing its connection to the visited W-LAN, for charging and other operational purposes, on that user's subscription with its Home Operator. This arrangement permits a visiting user, once authenticated as a visitor with regard to a particular LAN, to revisit that LAN for as long as the appropriate user authentication with the Home Operator remains sound, without further user intervention.

This represents a significant step forward in user convenience and is achieved by virtue of the operator of each W-LAN administering home (H) network and Visitor (V) network authentication, authorisation and accounting (AAA) servers, which communicate with one another regarding the subscriber's identity and other relevant operational/charging criteria. Thus, the VAAA automatically communicates with the HAAA to derive the necessary authorisation and to organise the necessary charging, etc.

In general, however, the authentication of a new (unknown) user wishing to connect to a W-LAN system is difficult and requires the use of a third party or some direct physical communication. Even activation of a new feature of an existing subscription may require contact with the customer care department of an operator, which is an expensive and error-prone procedure. However such authentication is achieved, it ultimately becomes a question of trust, which limits current public space W-LAN operations to providing open access only.

This invention aims to reduce the problems of authentication, thus permitting a wider range of services to be provided to users, including visiting users, without compromising either the security of the networks or the ability of the network operators to ensure that they receive due payment for their services.

According to the invention there is provided an access authentication system for authenticating access to a first wireless local area network (W-LAN), the operator of which administers a visitor authentication, authorisation and accounting (VAAA) server, wherein a user requesting visiting access to the first W-LAN, and having a valid cellular mobile account, a portable computing device with a browser and a registration with a second W-LAN operator that administers a home authentication, authorisation and accounting (HAAA) server, conveys to the VAAA server, by user intervention, identity information sufficient to enable said VAAA server to communicate with said HAAA server so as to authenticate the proposed connection; said HAAA issuing a personal identification number (PIN) which is encoded and forwarded to the user's mobile telephone and transferred to the browser to authenticate the requested visiting access to the W-LAN; the cost of such access being billed to the user's cellular mobile account and the requested access being achieved via the user's browser.

By this means, the existence of the user's mobile cellular account is used by the system to provide the necessary verification of the user's identity thus encouraging the W-LAN operator to provide, for example, extra secure services to that user. The SIM card that the mobile user must carry to operate the cellular mobile instrument thus acts as a certificate of trust between the mobile user and the network operator. Successful receipt by the user of a short message via the GSM or other short message service (SMS) addressed to the SIM is utilised to prove ownership of the SIM card, and hence identity of the user, without requiring a third party or manual intervention by the operator.

Preferably, the transfer of the PIN to the browser is effected manually by the user. Alternatively, however, it may be achieved automatically by means of software on the portable computer if this is connected to the mobile telephone. Such transfer can be effected remotely, for example by infra-red or Bluetooth, or directly by means of a cable connection.

Preferably, the PIN issued by the HAAA is encoded and forwarded to the user's mobile telephone by means of an SMS centre.

Preferably, in accordance with one aspect of the invention, the user employs the browser to convey said identity information (which may include or consist solely of a telephone number), via the first W-LAN, to the VAAA. This enables the user to set up a desired W-LAN log-on identity, and for this to be incorporated, together with the user's cellular telephone number, into the PIN. Preferably also, the PIN is combined with masking information, and it is further preferred that the masking information is randomly derived.

Preferably, in accordance with a second aspect of the invention, the user calls the VAAA on the mobile telephone to provide said identity information. In this case, the subject telephone call may be routed to the HAAA through a premium rate call unit.

Figure 2:
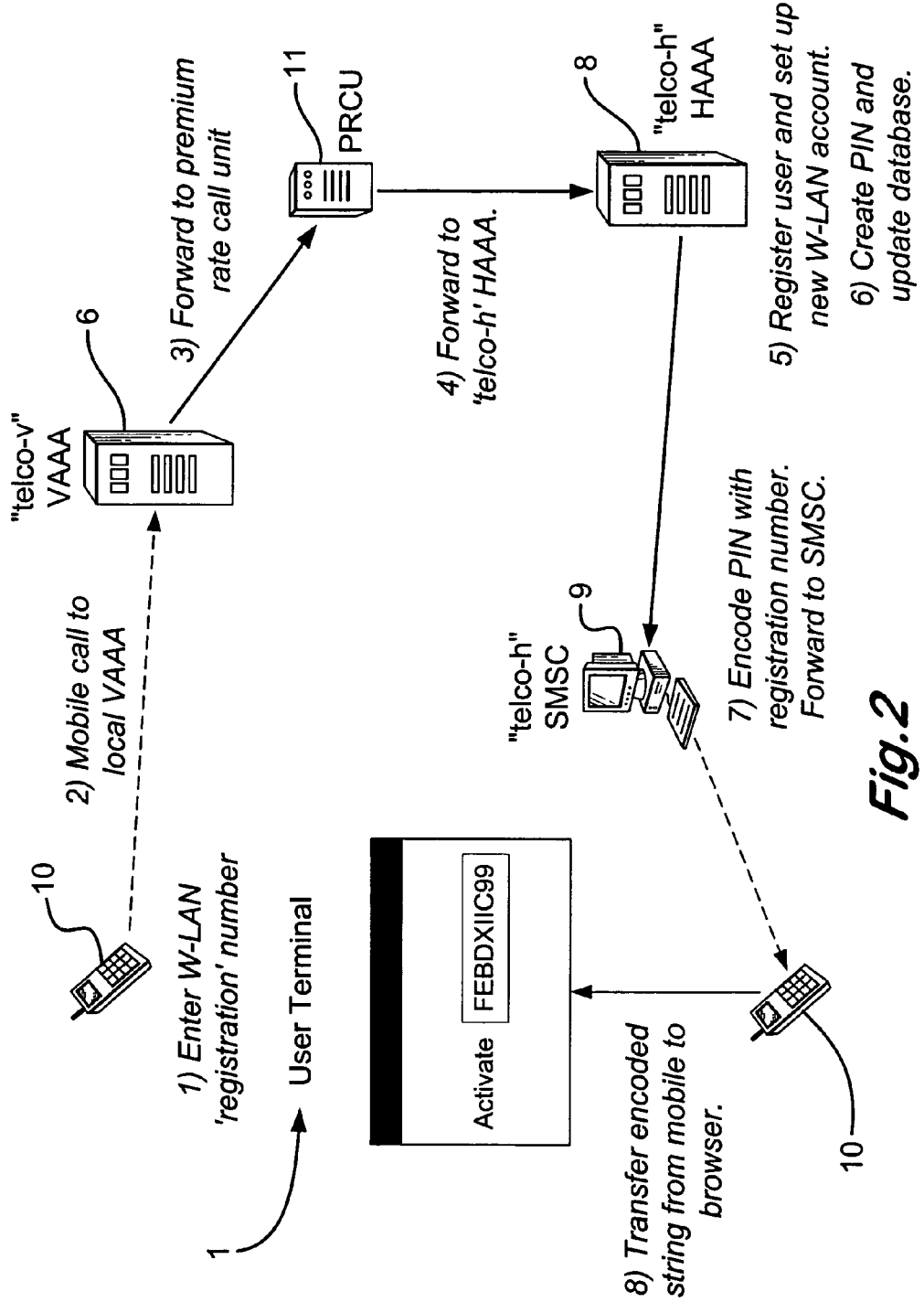

In order that the invention may be clearly understood and readily carried into effect, certain embodiments thereof will now be described, by way of example only, with reference to the accompanying drawings, of which:

FIG. 1 shows, in schematic form, the operation of a system in accordance with one embodiment of the invention; and FIG. 2 shows, in similar form, the operation of a system in accordance with a second embodiment of the invention.

Referring now to FIG. 1, there is shown schematically the operation of a system in accordance with one example of the invention; it being assumed at the outset that a visiting user wishing to connect to a W-LAN has a valid cellular mobile account, a portable device, such as a WAP telephone or a UMTS terminal, with appropriate computing capability, having a suitable W-LAN interface and HTTP-compliant browser.

Upon entering the W-LAN, indicated generally at 1, an introductory web page 2 is displayed on the browser of the portable device. This page 2 requests (at 3) insertion of a desired W-LAN identity, selected by the user, together with that of the home network operator (telco-h) with whom that user subscribes, and (at 4) the user's cellular telephone number. Instead of the user's cellular number, any other information sufficient to identify the user's cell phone account could be used.

The entered information is combined with a randomly derived masking data string and sent across the W-LAN to a local service selection gateway (SSG) 5 using a secure communication protocol, such as may be incorporated into the browser of the portable device.

The SSG 5 forwards the transmitted information to the local visitor AAA unit 6 owned by the operator, "telco-v" of the visited W-LAN, and thence to a telephony/Internet gateway 7 which utilises the information it receives to identify the mobile user's home AAA and sends the information to the home AAA, 8, which is operated of course by the user's home network operator, telco-h.

Telco-h establishes a W-LAN account for the user, which account is billed to the user's existing cellular account, although the subject charges are preferably made the subject of a separate entry list under the account so that they can be readily identified. In addition, at this stage, the home AAA, 8, generates a PIN, which is then encoded with the original masking data string and passed to a local short message service centre (SMSC), 9. The cellular mobile system then relays the message to the appropriate location, where it is received at the handset 10 of the mobile user, who manually transfers the encoded string from the message into the portable device, thus validating the W-LAN account creation process. Alternatively, the encoded string may be transferred automatically subject to the provision of a suitable data connection.

The above transaction can alternatively be achieved, if desired, by means including an infra-red (IR) link, short range wireless access device or by means of an extended cellular receiver unit embedded within the mobile user's portable device.

It is to be noted that the mobile user does not need to know individually the masking string and the PIN allocated by telco-h, only their combination.

If necessary, access for the mobile user to all or selected services on the visited W-LAN may be barred once the true identity of the home AAA 8 has been identified if, for example, it turns out to be a hostile regime, to be a bogus entry or to have a zero credit rating.

The operation of an alternative system, in accordance with a second embodiment of the invention, will now be described with reference to FIG. 2.

In this alternative system, a registration number is freely given to the visiting mobile user at entry to the W-LAN. The registration number may, for example, be displayed on a poster or a screen, or contained on a freely distributed leaflet or in a web page set up to act as a default page for unregistered users of the W-LAN.

The user's cellular mobile device is employed to contact a premium rate service and then enter the (public) registration number, which will then register the user with the W-LAN in a similar manner to that described above with respect to FIG. 1. Once the call is completed, the mobile user receives an SMS message, as described above, so completing the authentication process. In this case, the content of the message may be time-stamped and linked to the local access point and user identity, to prevent re-use or sharing of access.

Referring now specifically to FIG. 2, in which components identical with or functionally equivalent to those shown in FIG. 1 carry the same reference numbers, the user rings a premium rate number, using the mobile device 10, entering the public registration number to register with the W-LAN. The local visitor AAA, 6, routes this call to a premium rate call unit 11 which then sends the information to the home AAA, 8. The operator telco-h which owns this home AAA then establishes a W-LAN account for the user, billed, as before, to the existing cellular account for the mobile device 10.

A PIN is generated from this initialisation which is then encoded with the registration number sent from the user and passed to the local SMSC, 9. The cellular mobile system then relays the message to the appropriate location, where it is received by the mobile user on the handset, 10.

The user is then required to manually transfer the encoded data string (i.e. the string comprising the PIN encoded with the registration number) into the portable device with computing capability, thereby validating the WLAN account creation process. As before, this transaction can alternatively be achieved by means of an infra-red link, short range wireless access or an embedded cellular receiver unit inside the mobile user's portable device.

The web page is used to provide the data string to the LAN, to authenticate the access and then start encryption since it can then easily be user-specific, without the user needing to provide, for example, a MAC address.

It will be appreciated that the system of FIG. 2 is purely telephony network based. Advantageously, the network operator (telco-v) does not need to have web-based forms up and running to operate the system of FIG. 2. Moreover, the system of FIG. 2 generates revenue (or pre-payment revenue) via the premium access phone call, thus decoupling billing functionality from the W-LAN itself. This revenue can be automatically shared between the premium rate service provider and the W-LAN operator.

Although the invention has been described with regard to particular embodiments thereof, it is not intended that the scope of the claims of this application be limited to those embodiments, and alternative arrangements will be evident in many respects to those skilled in the art.

The invention claimed is:

1. An access authentication system for authenticating access to a first wireless local area network (W-LAN), the operator of which administers a visitor authentication, authorization and accounting (VAAA) server, wherein:

a user requesting visiting access to the first W-LAN, and having a mobile telephone, a valid cellular mobile account for the mobile telephone, a portable computing device with a browser, and a registration with a second W-LAN operator that administers a home authentication, authorization and accounting (HAAA) server, conveys to the VAAA server, by user intervention, identity information sufficient to enable said VAAA server to communicate with said HAAA server so as to authenticate the proposed connection;

said HAAA issues a personal identification number (PIN);

the PIN is encoded and forwarded to the user's mobile telephone and transferred to the browser to authenticate the requested visiting access to the W-LAN;

the cost of such access is billed to the user's cellular mobile account; and the requested access is achieved via the user's browser.

2. A system according to claim 1, wherein by the portable computing device conveys the identity information to the VAAA server independent of the mobile telephone.

3. A system according to claim 2 wherein the transfer of the PIN to the browser is effected manually by the user.

4. A system according to claim 2 wherein the portable computing device is coupled to the mobile telephone, and the transfer of the PIN to the browser is effected automatically by software supported by the portable computing device.

5. The system according to claim 4, wherein the portable computing device is coupled to the mobile telephone via a wireless link.

6. A system according to claim 2, wherein the PIN issued by the HAAA is encoded and forwarded to the user's mobile telephone by means of a short message service center.

7. A system according to claim 2, wherein the user employs the browser to convey said identity information, via the first W-LAN, to the VAAA.

8. A system according to claim 2, wherein the PIN is combined with masking information.

9. A system according to claim 8 wherein said masking information is randomly derived.

10. A system according to claim 2, wherein the user calls the VAAA on the mobile telephone.

11. A system according to claim 10 wherein the telephone call from said user is routed to the HAAA through a premium rate call unit.

12. A method for obtaining access to a first wireless local area network (W-LAN), the method comprising the acts of:
   transmitting, by a mobile telephone to a visitor authentication, authorization and accounting (VAAA) server, a request for access to the first W-LAN, the request including identity information of a home authentication, authorization and accounting (HAAA) server;
   receiving, by the mobile telephone from the HAAA server, a personal identification number (PIN);
   transferring the PIN to a browser of a portable computing device;
   authenticating the portable computing device using the PIN;
   accessing, by the portable computing device, the first W-LAN after the portable computing device has been authenticated, wherein the access by the portable computing device to the first W-LAN is performed independent of the mobile telephone and cost of the access is billed to a mobile account associated with the mobile telephone.

13. The method of claim 12, wherein the PIN is transferred to the browser by a user of the mobile telephone and portable computing device.

14. The method of claim 12, wherein the portable computing device is coupled to the mobile telephone, and the transfer of the PIN to the browser is effected automatically via a wireless link.

15. The method of claim 12, wherein the mobile telephone receives the PIN from the HAAA server via a short message service center.

16. The method of claim 12, further comprising the act of the mobile telephone calling the VAAA.

17. The method of claim 12, further comprising the acts of:
   receiving, by the HAAA server of a second W-LAN from the VAAA server of the first W-LAN, the request for access to the first W-LAN;
   establishing, by the second W-LAN, a W-LAN account for a user of the mobile telephone;
   generating, by the HAAA server, the PIN; and
   transmitting, by the HAAA server, the PIN to the user.

18. An access authentication system, comprising:
   a first wireless local area network (W-LAN) that includes a visitor authentication, authorization and accounting (VAAA) server;
   a second W-LAN that includes a home authentication, authorization and accounting (HAAA) server;
   a mobile telephone, a valid cellular mobile account for the mobile telephone;
   a portable computing device with a browser;
   wherein when access to the first W-LAN by the browser of the portable computing device is desired,
      the system is arranged to convey identity information sufficient to enable said VAAA server to communicate with said HAAA server so as to authenticate the access by the portable computing device to the first W-LAN,
      the HAAA is arranged to issue a personal identification number (PIN), encode and forward the PIN to the mobile telephone, by way of the second W-LAN,
      the system is arranged to transfer the PIN to the browser, which authenticates the portable computing device's access to the second W-LAN, and
      the system is arranged to bill the cost of access by the portable computing device to the second W-LAN to the cellular mobile account,
   wherein the access to the first W-LAN by the browser is performed independent of the mobile telephone.

19. A system according to claim 18, wherein the PIN issued by the HAAA is encoded and forwarded to the mobile telephone by a short message service center.

20. A system according to claim 18, wherein the browser conveys said identity information, via the first W-LAN, to the VAAA.

21. A system according to claim 18, wherein the user calls the VAAA on the mobile telephone.

22. A system according to claim 21, wherein the telephone call from said user is routed to the HAAA through a premium rate call unit.

* * * * *